US010400839B1

(12) United States Patent
Leiva et al.

(10) Patent No.: US 10,400,839 B1
(45) Date of Patent: Sep. 3, 2019

(54) AIRCRAFT BRAKE HEAT SHIELD

(71) Applicant: GOODRICH CORPORATION, Charlotte, NC (US)

(72) Inventors: Orly Leiva, Miamisburg, OH (US); William P. May, Tipp City, OH (US); Doug Schroeder, Tipp City, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 15/918,176

(22) Filed: Mar. 12, 2018

(51) Int. Cl.
| *F16D 65/84* | (2006.01) |
| *B32B 15/04* | (2006.01) |
| *B32B 15/18* | (2006.01) |
| *F16D 55/24* | (2006.01) |
| *F16D 65/78* | (2006.01) |

(52) U.S. Cl.
CPC .............. *F16D 65/84* (2013.01); *B32B 15/04* (2013.01); *B32B 15/18* (2013.01); *B32B 2250/05* (2013.01); *B32B 2262/105* (2013.01); *B32B 2307/306* (2013.01); *B32B 2605/18* (2013.01); *F16D 55/24* (2013.01); *F16D 2065/785* (2013.01); *F16D 2200/0039* (2013.01); *F16D 2200/0065* (2013.01); *F16D 2200/0078* (2013.01)

(58) Field of Classification Search
CPC .... B32B 3/10; B32B 3/28; B32B 7/02; B32B 5/22
USPC ..... 188/71.5, 71.6, 71.6 M, 264 G; 181/290, 181/291, 294; 301/6.2
See application file for complete search history.

(56) References Cited

U.S. PATENT DOCUMENTS

| 4,017,123 | A | | 4/1977 | Horner et al. | |
| 5,111,577 | A | * | 5/1992 | Sheridan | B32B 3/28 29/460 |
| 5,248,013 | A | | 9/1993 | Hogue et al. | |
| 5,385,790 | A | * | 1/1995 | Atkinson | B60R 13/08 428/126 |
| 5,424,139 | A | * | 6/1995 | Shuler | B21D 47/00 428/596 |
| 5,524,406 | A | * | 6/1996 | Ragland | B23K 11/087 219/117.1 |
| 5,550,338 | A | * | 8/1996 | Hielscher | B32B 3/10 181/290 |
| 6,276,044 | B1 | * | 8/2001 | Ragland | B21D 13/00 29/521 |
| 6,966,402 | B2 | * | 11/2005 | Matias | B32B 7/02 181/290 |
| 7,445,084 | B2 | * | 11/2008 | Berbner | B22F 3/002 181/290 |

(Continued)

FOREIGN PATENT DOCUMENTS

GB          878973        10/1961

*Primary Examiner* — Christopher P Schwartz
(74) *Attorney, Agent, or Firm* — Snell & Wilmer, L.L.P.

(57) ABSTRACT

The present disclosure provides a heat shield. The heat shield may comprise a first shield layer defining a cylindrical inner diameter surface of the heat shield, the cylindrical inner diameter surface having a radius and an axis, an air gap layer radially outward of the first shield layer, a second shield layer radially outward of the air gap layer, a first insulation layer radially outward of the second shield layer, a foil layer radially outward of the second shield layer, a second insulation layer radially outward of the foil layer, and a third shield layer radially outward of the second insulation layer.

19 Claims, 5 Drawing Sheets

(56) References Cited

U.S. PATENT DOCUMENTS

| | | | |
|---|---|---|---|
| 7,585,559 B2 * | 9/2009 | Schroeder | B32B 5/18 428/319.1 |
| 8,523,108 B2 | 9/2013 | Coty | |
| 2002/0098316 A1 * | 7/2002 | Butler | B32B 3/266 428/72 |
| 2004/0142152 A1 * | 7/2004 | Chen | B32B 15/04 428/174 |
| 2014/0238648 A1 * | 8/2014 | Lehr | B32B 5/22 165/135 |

* cited by examiner

AIRCRAFT BRAKE HEAT SHIELD

FIELD OF THE DISCLOSURE

The present disclosure relates to heat shield systems and methods, and more particularly, to heat shield systems and methods for aircraft braking systems.

BACKGROUND OF THE DISCLOSURE

Aircraft should complete a successful Rejected Takeoff (RTO) without allowing a sustained tire fire for a time period thereafter. In that regard, heat shields may be used to tend to prevent such a fire.

SUMMARY OF THE DISCLOSURE

A heat shield may comprise a first shield layer defining a cylindrical inner diameter surface of the heat shield, the cylindrical inner diameter surface having a radius and an axis, an air gap layer radially outward of the first shield layer, a second shield layer radially outward of the air gap layer, a first insulation layer radially outward of the second shield layer, a foil layer radially outward of the second shield layer, a second insulation layer radially outward of the foil layer, and a third shield layer radially outward of the second insulation layer.

In various embodiments, the first shield layer, the air gap layer, the second shield layer, the first insulation layer, the foil layer, the second insulation layer, and the third shield layer may be coaxial. An air pocket may be defined between the first insulation layer, the foil layer, the second insulation layer, and the third shield layer. The heat shield may further comprise a first ramp extending from a radially outer surface of the first insulation layer to a radially outer surface of the second insulation layer and extending in an axial direction from a first structure portion to a second structure portion of the heat shield, wherein the third shield layer partially defines the first ramp, first structure portion, and second structure portion. The heat shield may further comprise a second ramp extending from the radially outer surface of the second insulation layer to the radially outer surface of the first insulation layer and extending in an axial direction from the second structure portion to a third structure portion of the heat shield, wherein the third shield layer partially defines the second ramp, second structure portion, and third structure portion. The first insulation layer and second insulation layer may comprise one of a refractory ceramic fiber, an alkaline earth silicate, or a polycrystalline wool material. The first insulation layer may be adjacent to the second shield layer and the third shield layer in the first structure portion and the second structure portion. The foil layer and second insulation layer may extend less than an overall axial length of the heat shield. The first shield layer, second shield layer, and third shield layer may each comprise a thickness between approximately 0.005 inches and 0.025 inches.

A brake assembly for an aircraft may comprise a brake stack, a wheel well, and a heat shield comprising a first shield layer defining a cylindrical inner diameter surface of the heat shield, the cylindrical inner diameter surface having a radius and an axis, an air gap layer radially outward of the first shield layer, a second shield layer radially outward of the air gap layer, a first insulation layer radially outward of the second shield layer, a foil layer radially outward of the second shield layer, a second insulation layer radially outward of the foil layer, and a third shield layer radially outward of the second insulation layer.

In various embodiments, the heat shield may be situated radially between the brake stack and the wheel well. The first shield layer, the air gap layer, the second shield layer, the first insulation layer, the foil layer, the second insulation layer, and the third shield layer may be coaxial with each other. The brake assembly may further comprise an air pocket defined between the first insulation layer, the foil layer, the second insulation layer, and the third shield layer. The brake assembly may further comprise a first ramp extending from a radially outer surface of the first insulation layer to a radially outer surface of the second insulation layer and extending in an axial direction from a first structure portion to a second structure portion of the heat shield, wherein the third shield layer partially defines the first ramp, first structure portion, and second structure portion. The first insulation layer and second insulation layer may comprise one of a refractory ceramic fiber, an alkaline earth silicate, or a polycrystalline wool material.

A method of manufacturing a heat shield may comprise forming a first shield layer defining a cylindrical inner diameter surface, forming a second shield layer radially outward of the first shield layer, forming a first insulation layer radially outward of the second shield layer, forming a foil layer radially outward of the first insulation layer, forming a second insulation layer radially outward of the foil layer, and forming a third shield layer radially outward of the second insulation layer.

In various embodiments, forming the second shield layer may comprise forming the second shield layer such that an air gap layer is situated between the second shield layer and the first shield layer. The heat shield layers may be formed coaxial with each other. The foil layer and second insulation layer may be formed to extend less than an overall length of the heat shield. The first insulation layer and second insulation layer may be formed from one of a refractory ceramic fiber, an alkaline earth silicate, or a polycrystalline wool material.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with aircraft braking systems. However, various aspects of the disclosed embodiments may be adapted for performance in a variety of other systems. As such, numerous applications of the present disclosure may be realized.

Various embodiments of the present disclosure may result in improved heat shielding between a brake stack and an aircraft tire during RTOs. Typically, when an RTO is initiated, the aircraft is traveling at a high rate of speed and aircraft brakes are activated in order to reduce the speed of the aircraft. The aircraft brakes convert kinetic energy to thermal energy through friction, leading to high temperatures in the brake stacks. The heat in a brake stack may be transferred to an aircraft tire, which increases the potential for the tire to ignite. Accordingly, heat shields may be desired to reduce heat transfer from a brake stack to a tire.

Figure 1A:
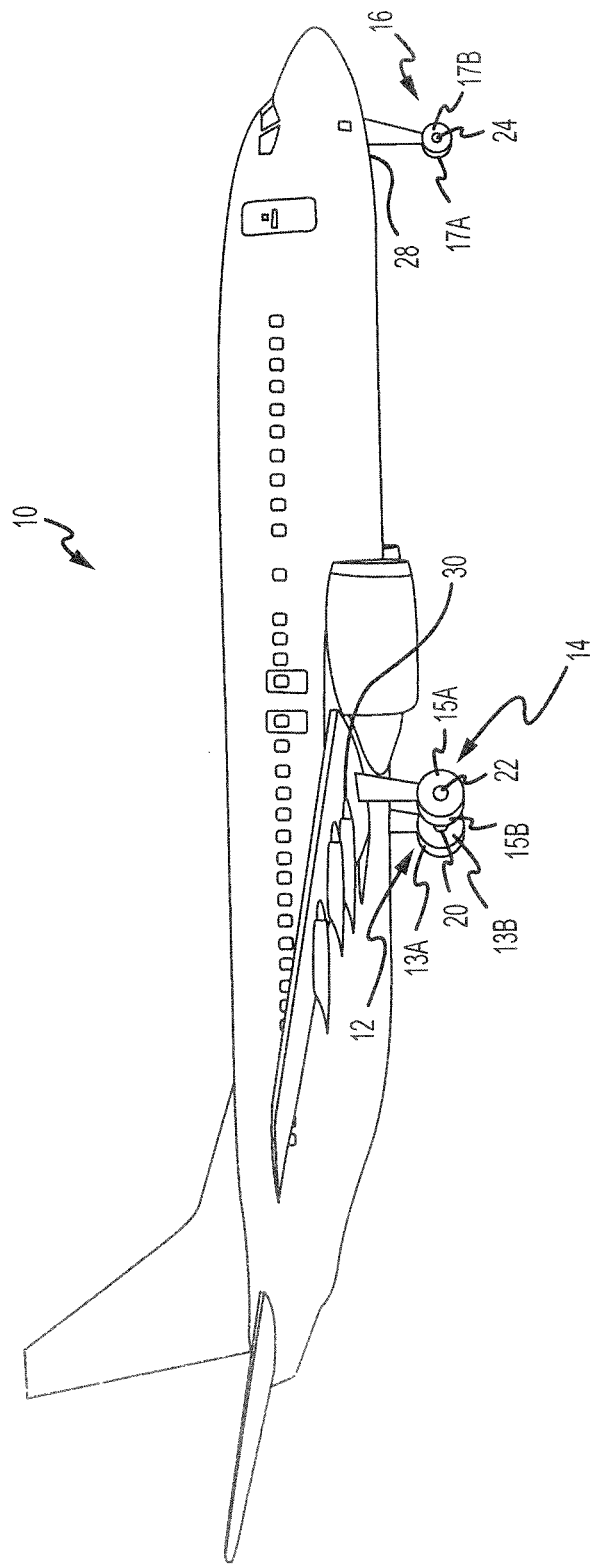
FIG. 1A illustrates an aircraft having a brake system comprising a heat shield, in accordance with various embodiments.

Referring now to FIG. 1A, in accordance with various embodiments, an aircraft 10 includes landing gear, such as a left main landing gear 12, a right main landing gear 14, and nose landing gear 16. The left main landing gear 12, right main landing gear 14, and nose landing gear 16 typically support the aircraft 10 when the aircraft 10 is not flying, thereby allowing the aircraft 10 to taxi, take off, and land without damage. In various embodiments, the left main landing gear 12 includes a first wheel 13A and a second wheel 13B coupled by an axle 20. In various embodiments, the right main landing gear 14 includes a first wheel 15A and a second wheel 15B coupled by an axle 22. In various embodiments, the nose landing gear 16 includes a first nose wheel 17A and a second nose wheel 17B coupled by an axle 24. In various embodiments, the aircraft 10 comprises any number of landing gear(s), and each landing gear comprises any number of wheels. In various embodiments, the left main landing gear 12, right main landing gear 14, and nose landing gear 16 are retracted when the aircraft 10 is in flight. In various embodiments, one or more of the left main landing gear 12, right main landing gear 14, and nose landing gear 16 extends from an underside of a fuselage 28 of the aircraft 10, or from an underside of the wings 30 thereof.

In various embodiments, the aircraft 10 also includes a brake system that is applied to one or more of the wheels 13A, 13B, 15A, 15B, 17A, 17B of one or more of the respective left main landing gear 12, right main landing gear 14, and/or nose landing gear 16. Such brake systems of the aircraft 10 typically comprise a collection of assemblies, subsystems, and/or units that produce output signals for controlling the braking force and/or torque applied at one or more of the wheels 13A, 13B, 15A, 15B, 17A, 17B. Such brake systems typically communicate with the brakes of the left main landing gear 12, right main landing gear 14, and/or nose landing gear 16, and each brake is typically mounted to each wheel 13A, 13B, 15A, 15B, 17A, 17B in order to apply and release braking forces thereon. In various embodiments, the brakes of the aircraft 10 further include a non-rotatable wheel support, the wheels 13A, 13B, 15A, 15B, 17A, 17B mounted to the wheel support for rotation, and a brake disk stack.

Figure 1B:
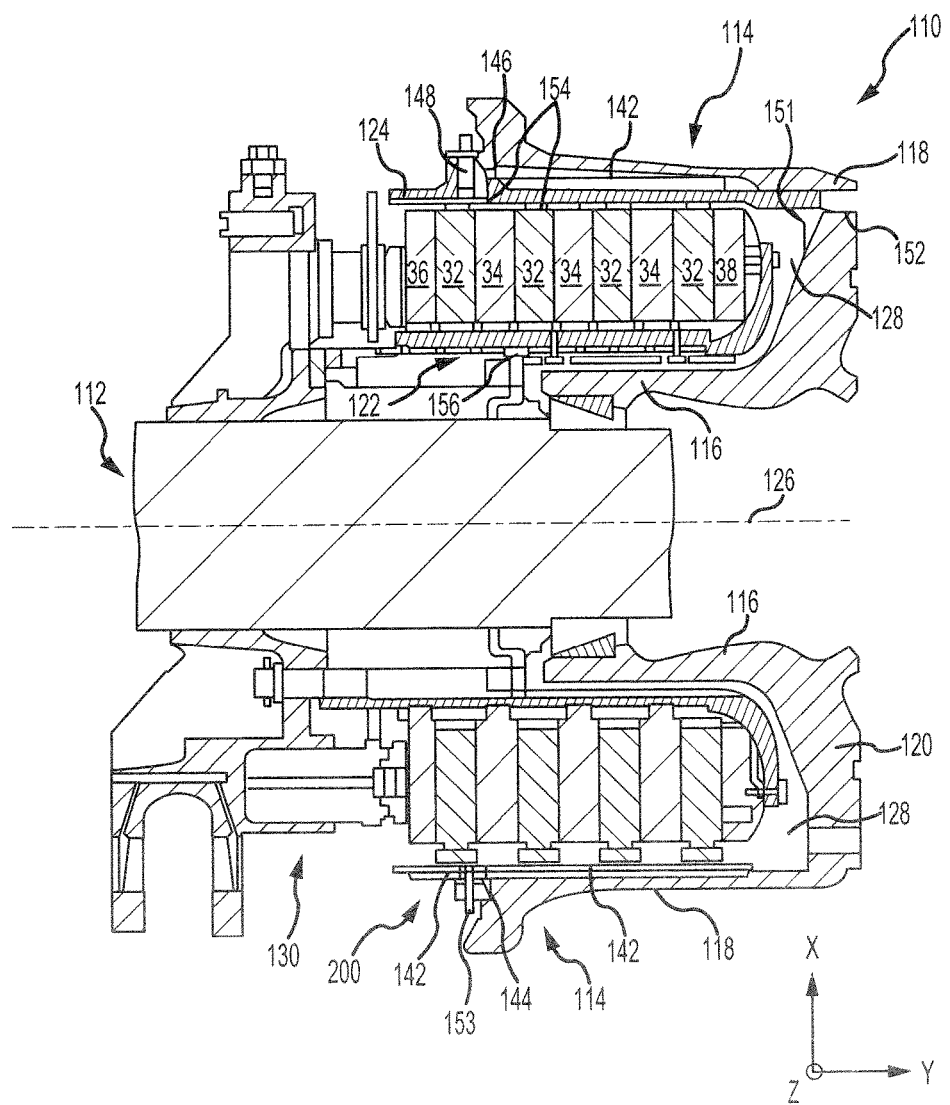
FIG. 1B illustrates a brake assembly comprising a heat shield, in accordance with various embodiments.

Referring now to FIG. 1B, a brake assembly 110 for mounting on an axle comprising a heat shield 200 is located on the aircraft 10 of FIG. 1A, in accordance with various embodiments. The brake assembly 110 for mounting on an axle typically comprises a bogie axle 112, a wheel 114 (e.g., the wheels 13A, 13B, 15A, 15B, 17A, 17B of FIG. 1-A) including a hub 116 and wheel well 118, a web 120, a torque take-out assembly 122, one or more torque bars 124, a wheel rotational axis 126, a wheel well recess 128, an actuator 130, multiple brake rotors 32, multiple brake stators 34, a pressure plate 36, an end plate 38, a heat shield 200 which may have sections 142, multiple heat shield carriers 144, an air gap 146, multiple torque bar bolts 148, a torque bar pin 151, a wheel web hole 152, multiple heat shield fasteners 153, multiple rotor lugs 154, and multiple stator slots 156.

Brake disks (e.g., the interleaved brake rotors 32 and brake stators 34) are disposed in the wheel well recess 128 of the wheel well 118. The brake rotors 32 and brake stators 34 may be referred to collectively as the brake stack or heat sink. The brake rotors 32 are typically secured to the torque bars 124 for rotating with the wheel 114, while the brake stators 34 are typically engaged with the torque take-out assembly 122. At least one actuator 130 is typically operable to compress the interleaved brake rotors 32 and brake stators 34 for stopping the aircraft 10 of FIG. 1A. In the embodiment of FIG. 1B, the actuator 130 is shown as a hydraulically actuated piston, though pistons driven pneumatically and by electromechanical actuators are also contemplated herein. The pressure plate 36 and end plate 38 are disposed at opposite ends of the interleaved brake rotors 32 and brake stators 34.

Through compression of the brake rotors 32 and brake stators 34 between the pressure plate 36 and end plate 38, the resulting frictional contact slows, stops, and/or prevents rotation of the wheel 114. The torque take-out assembly 122 is typically secured to a stationary portion of a landing gear truck, such as a bogie beam or other landing gear strut, such that the torque take-out assembly 122 and brake stators 34 are prevented from rotating during braking of the aircraft 10 of FIG. 1A. The brake rotors 32 and brake stators 34 are typically fabricated from various materials, such as, for example carbon materials. The brake disks typically withstand and dissipate the heat generated from contact between the brake disks while braking the aircraft 10 of FIG. 1A.

Figure 2:
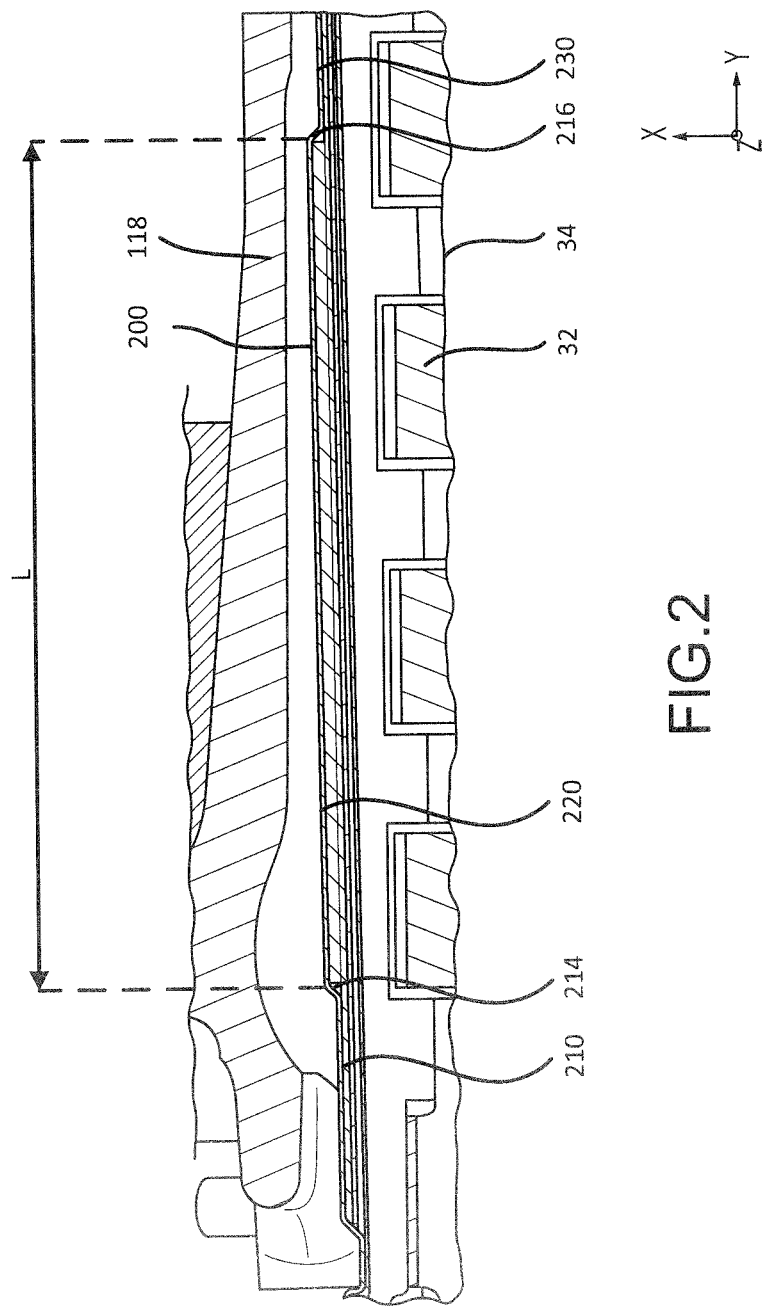
FIG. 2 illustrates a cross-sectional view of a heat shield attached to a brake assembly, in accordance with various embodiments.

Referring now to FIG. 2, heat shield 200 is attached to a wheel assembly, in accordance with various embodiments.

As referred to herein, radially may refer to the x-direction, while axially may refer to the y-direction as shown in FIG. 1B and FIG. 2. Heat shield 200 may be situated radially between the brake stack (brake rotors 32 and brake stators 34) and wheel well 118. Heat shield 200 may be configured to reduce an amount of radiative heat transferred from the brake stack to wheel well 118 during braking of the aircraft. Heat shield 200 may extend along an axial direction between the brake stack and wheel well 118. For example, heat shield 200 may comprise a length, extending in an axial direction between the brake stack and wheel well 118. As will be discussed below with reference to FIG. 3 and FIG. 4, heat shield 200 may comprise a first structure portion 210, a second structure portion 220, and a third structure portion 230. First structure portion 210 may be similar in structure to third structure portion 230. First structure portion 210 second structure portion 220, and third structure portion 230 may each comprise a portion of the length of heat shield 200. For example, moving from left to right in the y-direction, heat shield 200 may begin as first structure portion 210, transition into second structure portion 220, and transition into third structure portion 230. A length of second structure portion 220 may be designated as L. In various other embodiments, L may extend an entire axial length of heat shield 200 such that a length of heat shield 200 and L are equal.

Figure 3:
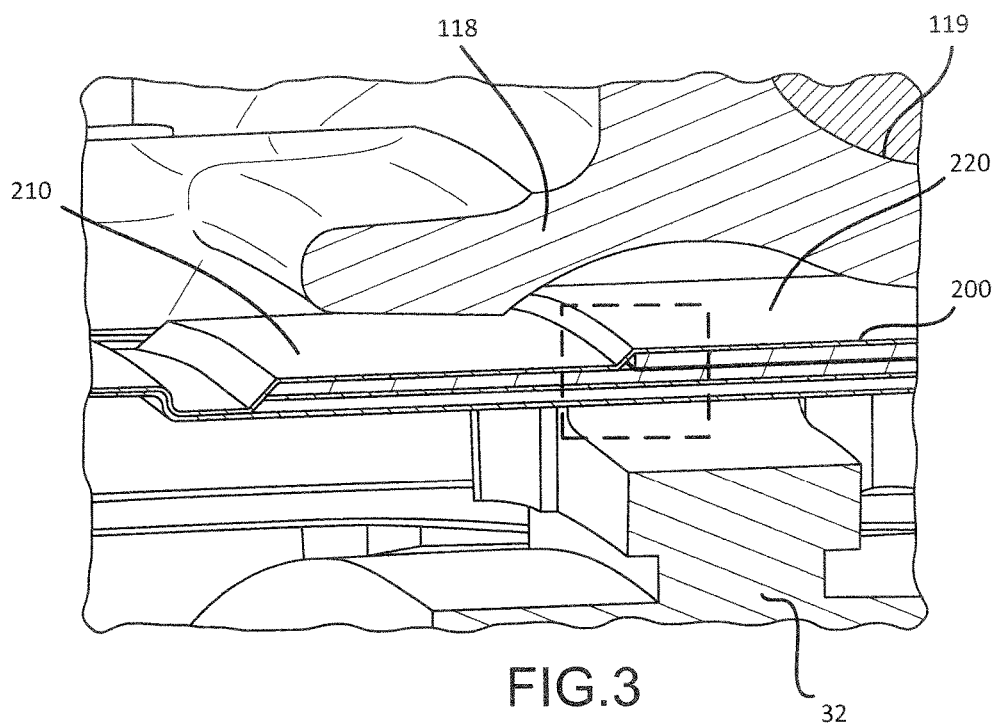
FIG. 3 illustrates an expanded cross-sectional view of the heat shield attached to a brake assembly of FIG. 2, in accordance with various embodiments.

Referring now to FIG. 3, heat shield 200 may be strategically positioned in an axial direction, in accordance with various embodiments. Second structure portion 220 comprising length L may be axially positioned along the y-axis such that it is positioned between the brake stack and wheel well 118 in areas that may be more likely to develop a tire fire. For example, second structure portion 220 may be positioned such that it is radially inward and axially aligned with bead seat 119 of wheel well 118. Bead seat 119 may be more likely to cause a tire to ignite due to the close proximity of bead seat 119 to the tire, which may result in greater conductive heat transfer between bead seat 119 and the tire.

Figure 4:
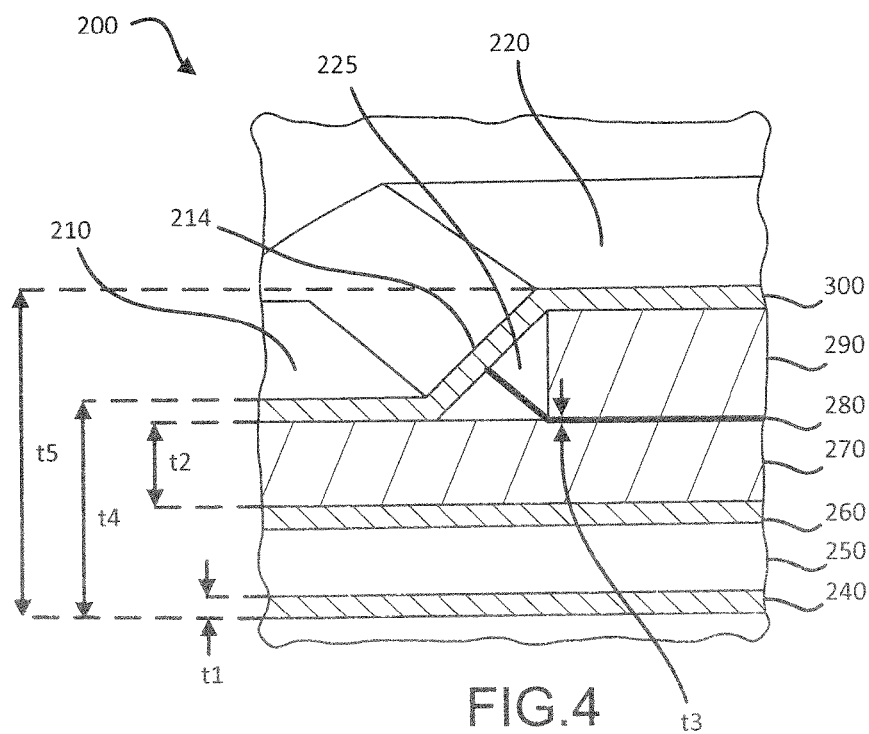
FIG. 4 illustrates a detailed view of the heat shield of FIG. 3, in accordance with various embodiments.

Referring now to FIG. 4, a detailed view of the heat shield of FIG. 3 is depicted, in accordance with various embodiments. As previously stated, a portion of heat shield 200 may comprise a first structure portion 210, a second structure portion 220, and a third structure portion 230. First structure portion 210 may transition to second structure portion 220 through first transition region 214 and second structure portion 220 may transition to third structure portion 230 through second transition region 216 (with momentary reference to FIG. 2). Second structure portion 220 may provide greater resistance to radiative heat transfer from the brake rotors 32 and brake stators 34 to wheel well 118.

First structure portion 210 and third structure portion 230 may each comprise a first shield layer 240, an air gap layer 250 radially outward of first shield layer 240, a second shield layer 260 radially outward of air gap layer 250, a first insulation layer 270 radially outward of second shield layer 260, and a third shield layer 300 radially outward of first insulation layer 270. First shield layer 240 may define a cylindrical inner diameter surface of heat shield 200. In first structure portion 210 and third structure portion 230, first insulation layer 270 may be adjacent to second shield layer 260 and third shield layer 300.

Second structure portion 220 may comprise the first shield layer 240, the air gap layer 250, the second shield layer 260, the first insulation layer 270 and the third shield layer 300. Second structure portion 220 may further comprise a foil layer 280 radially outward of first insulation layer 270, a second insulation layer 290 radially outward of foil layer 280 but radially inward of third shield layer 300. First shield layer 240, air gap layer 250, second shield layer 260, first insulation layer 270, foil layer 280, second insulation layer 290, and third shield layer 300 may be coaxial with each other. At first transition region 214, third shield layer 300 may form a first ramp extending between first structure portion 210 and second structure portion 220 of heat shield 200. Third shield layer 300 may partially define the first ramp, first structure portion 210, and second structure portion 220. For example, third shield layer 300 may extend from a radially outer surface of first insulation layer 270 to a radially outer surface of second insulation layer 290. At second transition region 216, third shield layer 300 may form a second ramp extending between second structure portion 220 and third structure portion 230 of heat shield 200. Third shield layer 300 may partially define the second ramp, second structure portion 220, and third structure portion 230. At first transition region 214, an air pocket 225 may be defined at a radially inner surface of third shield layer 300 between first insulation layer 270, foil layer 280, second insulation layer 290 and third shield layer 300. Air pocket 225 may allow cooling airflow through heat shield 200. A similar air pocket may be formed at second transition region 216 between first insulation layer 270, foil layer 280, second insulation layer 290, and third shield layer 300.

First shield layer 240, second shield layer 260, and third shield layer 300 may comprise a steel alloy, in various embodiments, however, the shield layers are not limited in this regard. In various other embodiments, first shield layer 240, second shield layer 260, and third shield layer 300 may comprise other materials capable of maintaining structural integrity of heat shield 200 and shielding wheel well 118 from fires developing at or near the brake rotors 32 and brake stators 34. First shield layer 240, second shield layer 260, and third shield layer 300 may comprise thickness, denoted t1. In various embodiments, t1 may be between approximately 0.005 inches (or 0.127 mm) and 0.025 inches (or 0.635 mm), between approximately 0.010 inches (or 0.254 mm) and 0.020 inches (or 0.508 mm), or between approximately 0.014 inches (or 0.356 mm) and 0.016 inches (or 0.406 mm). While in various embodiments t1 is equal in all first shield layer 240, second shield layer 260, and third shield layer 300, t1 is not limited in this regard. In various embodiments, first shield layer 240, second shield layer 260, and third shield layer 300 may comprise different thicknesses.

First insulation layer 270 and second insulation layer 290 may comprise refractory ceramic fiber insulating papers such as those made by the company, Unifrax. First insulation layer 270 and second insulation layer 290 may also comprise insulating papers comprising alkaline earth silicates, and/or polycrystalline wool materials, however, first insulation layer 270 and second insulation layer 290 are not limited in this regard. First insulation layer 270 and second insulation layer 290 may comprise a thickness, denoted t2. In various embodiments, t2 may be between approximately 0.060 inches (or 1.524 mm) and 0.080 inches (or 2.032 mm), between approximately 0.065 inches (or 1.651 mm) and 0.075 inches (or 1.905 mm), or between approximately 0.069 inches (or 1.753 mm) and 0.071 inches (1.803 mm), however, t2 is not limited in this regard. Further, while in various embodiments first insulation layer 270 and second insulation layer 290 are of equal thickness, in various embodiments, first insulation layer 270 may have a thickness greater or less than second insulation layer 290.

Foil layer 280 may comprise a steel foil, titanium foil, or other metallic foil capable of preventing radiative heat transfer from the brake stack to wheel well 118. In various embodiments, foil layer 280 may comprise a thickness, denoted t3. In various embodiments, t3 may be between approximately 0.001 inches (or 0.025 mm) and 0.007 inches (or 0.178 mm), between approximately 0.002 inches (or 0.051 mm) and 0.006 inches (or 0.152 mm), or between 0.003 inches (or 0.076 mm) and 0.005 inches (or 0.127 mm), however, t3 is not limited in this regard. Foil layer 280 may function to prevent radiative heat transfer from the brake stack to wheel well 118 in the event flames breach first shield layer 240 and second shield layer 260 and first insulation layer 270 and second insulation layer 290 break apart.

Heat shield 200 may further comprise an air gap layer 250 situated radially between first shield layer 240 and second shield layer 260. Air gap layer 250 may function to minimize convective flow between first shield layer 240 and second shield layer 260. For example, during an RTO, a flame may form radially inward of first shield layer 240. Prior to the flame burning through first shield layer 240, first shield layer 240 may increase in temperature. Air gap layer 250 may reduce the convective transfer of heat from first shield layer 240 to second shield layer 260 while first shield layer 240 is being heated by the flame. Accordingly, heat shield 200 may be more effective at reducing radiative heat transfer from the brake stack to wheel well 118 when compared with a heat shield comprising an additional layer of insulation in place of air gap layer 250. Additional layers of insulation in place of air gap layer 250 may function to keep first shield layer 240 at a higher temperature, thereby leading to a quicker burn through.

First structure portion 210 and third structure portion 230 may comprise a thickness, denoted t4. In various embodiments, t4 may be between approximately 0.100 inches (or 2.540 mm) and 0.200 inches (or 5.080 mm), between approximately 0.125 inches (or 3.175 mm) and 0.175 inches (or 4.445 mm), or between 0.152 inches (or 3.861 mm) and 0.154 inches (or 3.912 mm), however, t4 is not limited in this regard. In various embodiments, t4 may comprise a greater or smaller thickness due to first shield layer 240, air gap layer 250, second shield layer 260, first insulation layer 270, and/or third shield layer 300 comprising a different thickness than disclosed in the present embodiment. Second structure portion 220 may comprise a different thickness, denoted t5. In various embodiments, t5 may be between approximately 0.175 inches (or 4.445 mm) and 0.275 inches (or 6.985 mm), between approximately 0.200 inches (or 5.080 mm) and 0.230 inches (or 6.350 mm), or between approximately 0.227 inches (or 5.766 mm) and 0.229 inches (or 5.817 mm), however, t5 is not limited in this regard. In various embodiments, t5 may comprise a greater or smaller thickness due to first shield layer 240, air gap layer 250, second shield layer 260, first insulation layer 270, foil layer 280, second insulation layer 290, and/or third shield layer 300 comprising a different thickness than disclosed in the present embodiment. In various embodiments, the thickness t5 of second structure portion 220 may be thicker than the thickness t4 of first structure portion 210 in order to provide greater resistance to radiative heat transfer from the brake stack to wheel well 118. While various embodiments include a first structure portion 210, first transition region 214, second structure portion 220, second transition region 216, and third structure portion 230, the structure of heat shield 200 is not limited in this regard. In various embodiments, second structure portion 220 may extend an entire axial length of heat shield 200 to provide greater radiative heat transfer throughout an entire axial length of wheel well 118.

Figure 5:
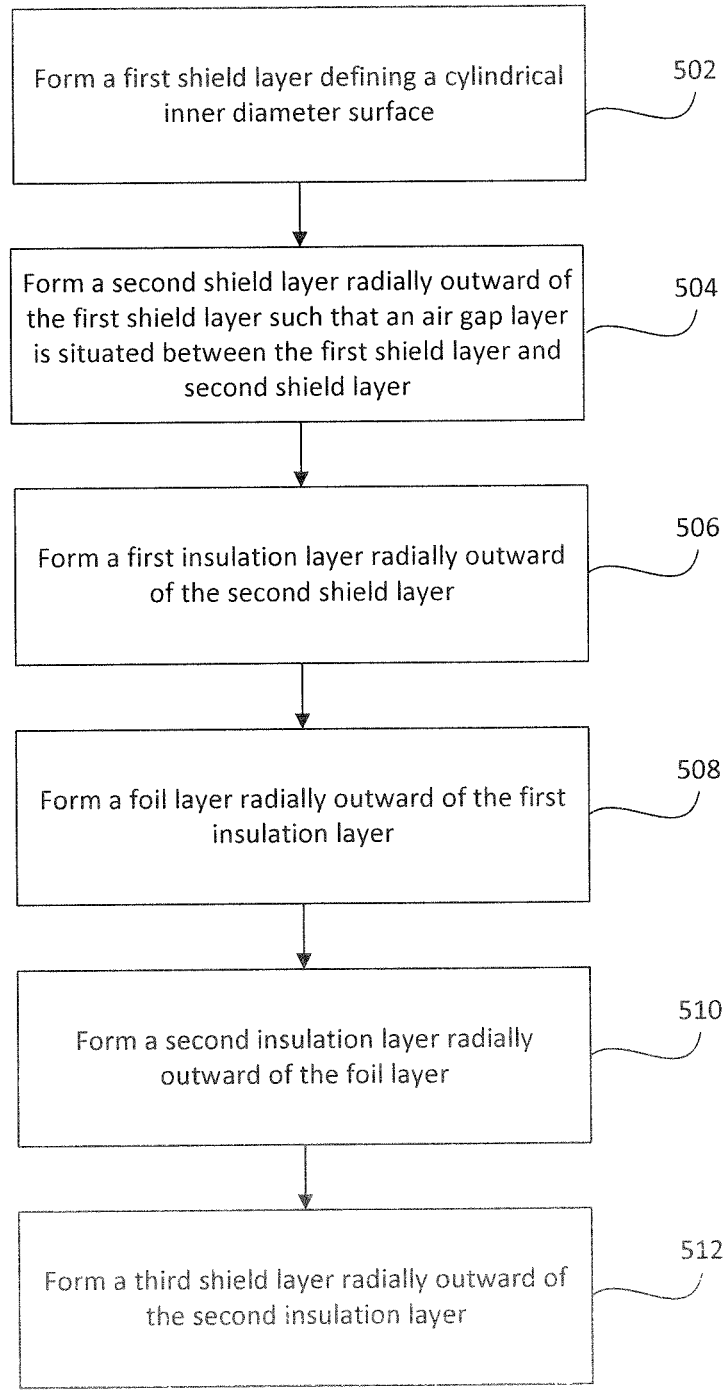
FIG. 5 illustrates a method of manufacturing a heat shield, in accordance with various embodiments.

A block diagram illustrating a method 500 for manufacturing a heat shield is illustrated in FIG. 5, in accordance with various embodiments. Method 500 may comprise forming a first shield layer defining a cylindrical inner diameter surface (Step 502). The method may further comprise forming a second shield layer radially outward of the first shield layer such that an air gap layer is situated between the first shield layer and the second shield layer (Step 504). The method may further comprise forming a first insulation layer radially outward of the second shield layer (Step 506). The method may further comprise forming a foil layer radially outward of the first insulation layer (Step 508). The method may further comprise forming a second insulation layer radially outward of the first insulation layer (Step 510). The method may further comprise forming a third shield layer radially outward of the second insulation layer (Step 512).

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods, systems, and computer-readable media are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A heat shield comprising,
a first shield layer defining a cylindrical inner diameter surface of the heat shield, the cylindrical inner diameter surface having a radius and an axis;
an air gap layer radially outward of the first shield layer;
a second shield layer radially outward of the air gap layer;
a first insulation layer radially outward of the second shield layer;
a foil layer radially outward of the second shield layer;
a second insulation layer radially outward of the foil layer; and
a third shield layer radially outward of the second insulation layer, wherein the air gap layer extends an entire radial distance between the first shield layer and the second shield layer.

2. The heat shield of claim 1, wherein the first shield layer, the air gap layer, the second shield layer, the first insulation layer, the foil layer, the second insulation layer, and the third shield layer are coaxial.

3. The heat shield of claim 1, further comprising an air pocket defined between the first insulation layer, the foil layer, the second insulation layer, and the third shield layer.

4. The heat shield of claim 1, further comprising a first ramp extending from a radially outer surface of the first insulation layer to a radially outer surface of the second insulation layer and extending in an axial direction from a first structure portion to a second structure portion of the heat shield, wherein the third shield layer partially defines the first ramp, first structure portion, and second structure portion.

5. The heat shield of claim 4, further comprising a second ramp extending from the radially outer surface of the second insulation layer to the radially outer surface of the first insulation layer and extending in an axial direction from the second structure portion to a third structure portion of the heat shield, wherein the third shield layer partially defines the second ramp, second structure portion, and third structure portion.

6. The heat shield of claim 1, wherein the first insulation layer and second insulation layer comprise one of a refractory ceramic fiber, an alkaline earth silicate, or a polycrystalline wool material.

7. The heat shield of claim 1, wherein the first insulation layer is adjacent to the second shield layer and the third shield layer in the first structure portion and the third structure portion.

8. The heat shield of claim 1, wherein the foil layer and second insulation layer extend less than an overall axial length of the heat shield.

9. The heat shield of claim 1, wherein the first shield layer, second shield layer, and third shield layer each comprise a thickness between approximately 0.005 inches and 0.025 inches.

10. A brake assembly for an aircraft comprising,
a brake stack;
a wheel well; and
a heat shield, comprising,
a first shield layer defining a cylindrical inner diameter surface of the heat shield, the cylindrical inner diameter surface having a radius and an axis;
an air gap layer radially outward of the first shield layer;
a second shield layer radially outward of the air gap layer;
a first insulation layer radially outward of the second shield layer;
a foil layer radially outward of the second shield layer;
a second insulation layer radially outward of the foil layer; and
a third shield layer radially outward of the second insulation layer, wherein the air gap layer extends an entire radial distance between the first shield layer and the second shield layer.

11. The brake assembly of claim 10, wherein the heat shield is situated radially between the brake stack and the wheel well.

12. The brake assembly of claim 10, wherein the first shield layer, the air gap layer, the second shield layer, the first insulation layer, the foil layer, the second insulation layer, and the third shield layer are coaxial with each other.

13. The brake assembly of claim 10, further comprising an air pocket defined between the first insulation layer, the foil layer, the second insulation layer, and the third shield layer.

14. The brake assembly of claim 10, further comprising a first ramp extending from a radially outer surface of the first insulation layer to a radially outer surface of the second insulation layer and extending in an axial direction from a first structure portion to a second structure portion of the heat shield, wherein the third shield layer partially defines the first ramp, first structure portion, and second structure portion.

15. The brake assembly of claim 10, wherein the first insulation layer and second insulation layer comprise one of a refractory ceramic fiber, an alkaline earth silicate, or a polycrystalline wool material.

16. A method of manufacturing a heat shield comprising,
forming a first shield layer defining a cylindrical inner diameter surface;
forming a second shield layer radially outward of the first shield;
forming a first insulation layer radially outward of the second shield layer;
forming a foil layer radially outward of the first insulation layer;
forming a second insulation layer radially outward of the foil layer; and
forming a third shield layer radially outward of the second insulation layer, wherein an air gap layer is formed between the first shield layer and the second shield layer, the air gap layer extending an entire radial distance between the first shield layer and the second shield layer.

17. The method of claim 16, wherein the heat shield layers are formed coaxial with each other.

18. The method of claim 16, wherein the foil layer and second insulation layer are formed to extend less than an overall length of the heat shield.

19. The method of claim 16, wherein the first insulation layer and second insulation layer are formed from one of a refractory ceramic fiber, an alkaline earth silicate, or a polycrystalline wool material.

* * * * *